United States Patent
Deng et al.

(10) Patent No.: US 10,514,466 B1
(45) Date of Patent: Dec. 24, 2019

(54) METHOD AND APPARATUS FOR DEMODULATING GNSS NAVIGATION DATA BITS UNDER POOR CLOCK CONDITION

(71) Applicant: Marvell International Ltd., Hamilton (BM)

(72) Inventors: Jiangping Deng, Shanghai (CN); Zhike Jia, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 346 days.

(21) Appl. No.: 15/371,029

(22) Filed: Dec. 6, 2016

Related U.S. Application Data (60) Provisional application No. 62/263,992, filed on Dec. 7, 2015.

(51) Int. Cl.
| | |
|---|---|
| *G01S 19/29* | (2010.01) |
| *G01S 19/24* | (2010.01) |
| *G01S 19/40* | (2010.01) |
| *G01S 19/38* | (2010.01) |

(52) U.S. Cl.
CPC .......... *G01S 19/243* (2013.01); *G01S 19/29* (2013.01); *G01S 19/40* (2013.01); *G01S 19/38* (2013.01)

(58) Field of Classification Search
CPC .......... G01S 5/0252; G01S 5/14; G01S 19/00; G01S 19/38; G01S 19/40
USPC ................ 342/452, 357.2, 357.21, 357.23
See application file for complete search history.

(56) References Cited

U.S. PATENT DOCUMENTS

| | | | | |
|---|---|---|---|---|
| 6,020,847 A * | 2/2000 | Upton | ........................ | G01S 5/12 342/357.78 |
| 7,209,529 B2 * | 4/2007 | Iancu | ........................ | G01S 19/29 342/357.68 |
| 7,391,366 B2 * | 6/2008 | Park | ........................ | G01S 19/254 342/357.59 |
| 7,447,253 B2 * | 11/2008 | Abraham | ................. | G01S 19/24 342/357.23 |
| 7,477,189 B2 * | 1/2009 | Wang | .................... | G01S 19/235 342/357.62 |
| 7,573,423 B2 * | 8/2009 | Monnerat | ............... | G01S 19/29 342/357.68 |
| 7,903,028 B2 * | 3/2011 | Wang | ........................ | G01S 19/27 342/357.77 |

(Continued)

*Primary Examiner* — Chuong P Nguyen (57) ABSTRACT

Methods and systems for demodulating GNSS navigation data bits in conditions that can cause a Doppler error, such as a GNSS receiver operating under a poor clock condition, in one aspect, include: receiving a modulated Global Navigation Satellite System (GNSS) carrier signal, wherein the GNSS carrier signal includes navigation bits; compensating for a Doppler error of the GNSS carrier signal using Doppler error compensation frequencies, wherein the compensating comprises determining in-phase (I) correlation results and quadrature (Q) correlation results at the Doppler error compensation frequencies; calculating dot products using the I correlation results and the Q correlation results from the compensating; determining a dot product from the calculated dot products having a maximum absolute value; and demodulating the GNSS carrier signal using the determined dot product having the maximum absolute value to extract the navigation bits from the GNSS carrier signal.

11 Claims, 5 Drawing Sheets

(56) References Cited

U.S. PATENT DOCUMENTS

| | | | | |
|---|---|---|---|---|
| 8,094,758 B2* | 1/2012 | Wang | ............ | G01S 19/24 |
| | | | | 375/142 |
| 9,319,097 B2* | 4/2016 | Chae | ............ | H04B 1/709 |
| 9,544,028 B2* | 1/2017 | Siwiak | ............ | H04B 7/01 |
| 10,051,437 B1* | 8/2018 | Deng | ............ | H04L 27/2271 |
| 2006/0012515 A1* | 1/2006 | Park | ............ | G01S 19/254 |
| | | | | 342/357.59 |
| 2010/0279732 A1* | 11/2010 | Hjelm | ............ | G01S 19/06 |
| | | | | 455/552.1 |

\* cited by examiner

METHOD AND APPARATUS FOR DEMODULATING GNSS NAVIGATION DATA BITS UNDER POOR CLOCK CONDITION

CROSS REFERENCE TO RELATED APPLICATION

This application claims the benefit under 35 U.S.C. § 119(e) of U.S. Patent Application No. 62/263,992 entitled, "METHOD AND APPARATUS FOR DEMODULATING GNSS NAVIGATION DATA BITS UNDER POOR CLOCK CONDITION", filed Dec. 7, 2015, which is incorporated herein by reference in its entirety.

BACKGROUND

This disclosure relates to methods and systems for processing Global Navigation Satellite System (GNSS) navigation data, and in particular, methods and systems for demodulating GNSS navigation data bits in conditions that can cause a Doppler error, such as a GNSS receiver operating under a poor clock condition.

In existing GNSS systems, navigation data contains position and/or time related information such as ephemeris, almanac, satellite time, etc. The navigation data is coded to binary bits and modulated on a GNSS carrier signal along with various pseudorandom codes. The navigation data is used by a GNSS receiver, for example, to perform various navigation capabilities, such as calculating position, velocity and time (PVT) of the receiver.

Some existing demodulation methods employed for GNSS signal processing, including non-coherent demodulation, can be sensitive to the accuracy of the carrier signal. Therefore, in order for the demodulation techniques to be precise, the GNSS signal needs to be well tracked. Consequently, in instances where the tracked carrier Doppler experiences a significant error, the performance of existing demodulation will degrade and the demodulated bits will potentially become inaccurate. As an example, a significant error to the carrier Doppler can be characterized by a Doppler error that is larger than $1/(4T)$ Hz (i.e., T is a coherent integration time for correlation results). Therefore, it is desirable to compensate for Doppler error in demodulating a GNSS carrier signal.

The background description provided above is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure includes methods and systems for demodulating GNSS navigation data bits in conditions that can cause a Doppler error, such as a GNSS receiver operating under a poor clock condition.

In general, one or more aspects of the subject matter described in this specification can be embodied in one or more methods that include: receiving a modulated Global Navigation Satellite System (GNSS) carrier signal, wherein the GNSS carrier signal includes navigation bits; compensating for a Doppler error of the GNSS carrier signal using Doppler error compensation frequencies, wherein the compensating comprises determining in-phase (I) correlation results and quadrature (Q) correlation results at the Doppler error compensation frequencies; calculating dot products using the I correlation results and the Q correlation results from the compensating; determining a dot product from the calculated dot products having a maximum absolute value; and demodulating the GNSS carrier signal using the determined dot product having the maximum absolute value to extract the navigation bits from the GNSS carrier signal. These and other embodiments can optionally include one or more of the following features.

The described systems and techniques can be implemented in electronic circuitry, computer hardware, firmware, software, or in combinations of them, such as the structural means disclosed in this specification and structural equivalents thereof.

Particular embodiments of the subject matter described in this specification can be implemented to realize one or more of the following advantages. The techniques and systems described realize a solution that significantly reduces a power loss associated with dot products calculated for the demodulation of navigation data bits, for example, as compared to some existing demodulation techniques. The techniques and systems described not only compensate for Doppler error that can affect accuracy of a carrier Doppler at the GNSS receiver (e.g., poor clock conditions), but also prevents the inaccuracies related to Doppler error from propagating into demodulation processing and potentially causing additional errors in the extracted navigation data bits.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
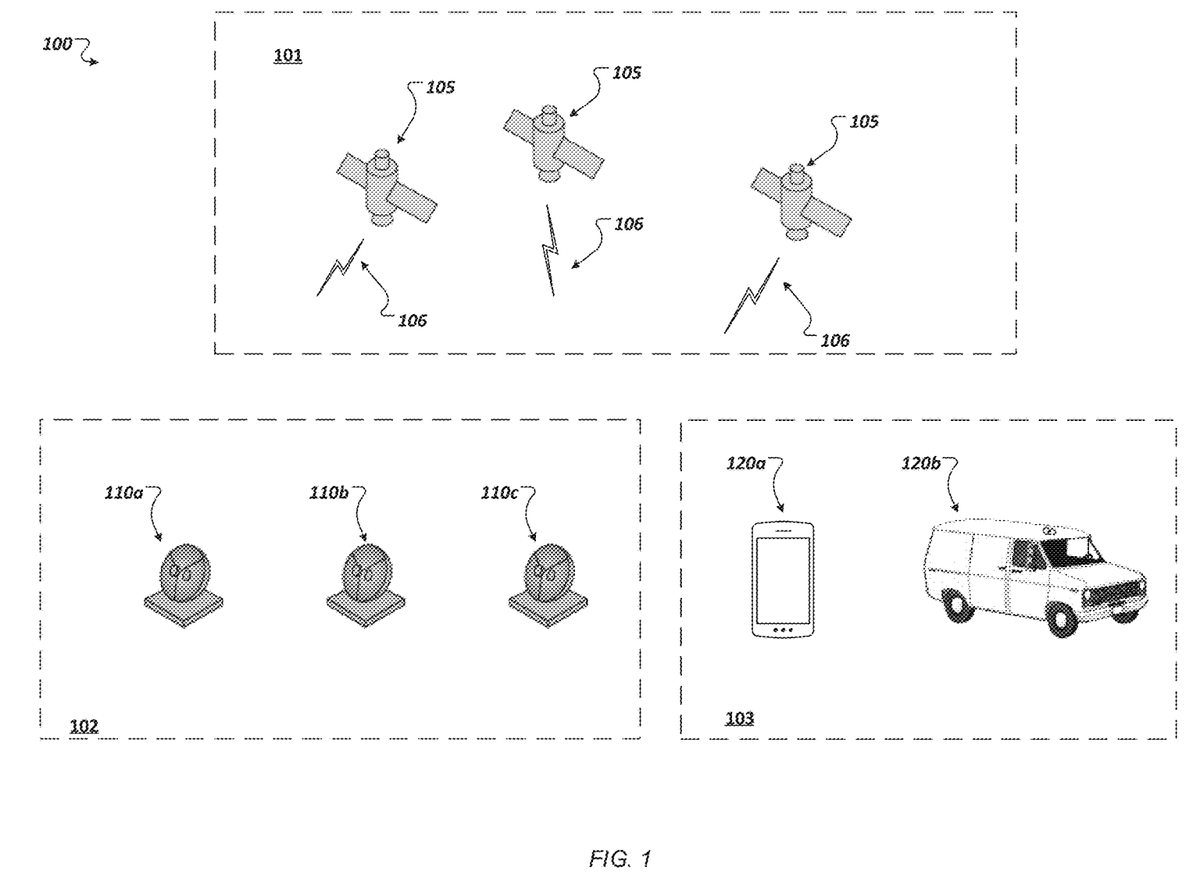
FIG. 1 shows an example of a GNSS satellite system.

This disclosure provides details and examples of methods and systems for demodulating GNSS navigation data bits in conditions that can cause a Doppler error, such as a GNSS receiver operating under a poor clock condition. The GNSS is satellite tracking technology that is currently implemented using four different satellite technologies: Global Positioning System (GPS), GLObal NAvigation Satellite System (GLONASS), BeiDous Navigation Satellite System (DBS), or Galileo. Each of the technologies consists mainly of three segments: space segment 101, control segment 102, and user segment 103, which are shown in FIG. 1. These segments are similar in the three different current satellite technologies.

The transmission of GNSS carrier signals 106 from satellites 105 to a GNSS receiver is supported by a GNSS satellite system 100 (e.g., a GPS system). A GNSS carrier signal 106, which is received as input at a GNSS receiver, can be characterized as a sum of signal components, including for example: signal power; a navigation message; a spreading sequence; a code delay; and a carrier Doppler, representing the frequency and carrier phase introduced into the GNSS carrier signal 106 by the communication channel. Modulation is usable to combine these independent signal components into the GNSS carrier signal 106 that is transmitted by satellites 105, using direct-sequence spread-spectrum (DS/SS) techniques. As an example, a GNSS receiver uses the carrier Doppler during the acquisition phase, to account for changes in the received signal that can otherwise cause degraded correlator outputs that will further degrade the acquisition capability of the receiver. Therefore, the accuracy of the carrier Doppler at the GNSS receiver impacts the function of the tracking loops, and subsequently affects demodulation of the GNSS carrier signal components used in GNSS capabilities (e.g., GPS navigation) as implemented in devices in the user segment 103, illustrated as cellular phone 120a and vehicle 120b. Some existing tracking loops experience sensitivity to frequency error, and as a result, the demodulation techniques used in GNSS receivers are limited to how well the GNSS signal is tracked, such as accuracy of the received signal frequency. However, in some instances, the tracked carrier Doppler has error, which results in a loss of power when dot products are calculated in existing non-coherent demodulation techniques, for example. Poor clock conditions and high dynamic scenarios (e.g., increased movement of the satellite and/or the GNSS receiver) can cause a Doppler error to be introduced into the carrier Doppler.

In some scenarios, a small change in temperature of the GNSS receiver clock causes a disproportionately large change in the carrier Doppler. Thus, a Doppler tracking error is potentially experienced before a tracking loop catches up with the Doppler change, which results in performance degradation of non-coherent demodulation. In some cases, a propagated impact of Doppler error at the GNSS receiver leads to errors in the demodulated bits. Therefore, as an example, a large, or significant, Doppler error can cause an GNSS receiver to retrieve incorrect navigation data from the carrier GNSS signal. The techniques described provides Doppler error compensation that yields less power loss, tolerates larger Doppler errors, and improves demodulation of GNSS signal components, in relation to existing demodulation methods used in the GNSS systems (e.g., non-coherent demodulation and coherent demodulation).

FIG. 1 depicts the space segment 101 consisting of satellites 105, each transmitting a GNSS carrier signal 106. For example, the satellites 105 and GNSS receivers, which receivers are included in cellular phone 120a and vehicle 120b, can be used for the acquisition and tracking of many signals as used in GNSS. Specifically, FIG. 1 shows an example of GNSS for the acquisition and tracking of signals from GPS satellites. Accordingly, an exemplary embodiment of the present invention will be described in an application of acquiring and tracking signals from GPS satellites in environments suitable for employing Doppler error compensation techniques, such as poor clock conditions.

As shown in FIG. 1, multiple satellites 105 form a GPS constellation in the space segment 101 that keeps time with atomic clocks aboard. A satellite 105 can transmit a GNSS carrier signal 106, as a radio frequency (RF) signal, at several frequencies including L1 (i.e., 1575.42 MHz) and L2 (i.e., 1227.60 MHz), for example. GNSS carrier signals 106 carry information on its in-phase and quadrature components. The components can be phase-modulated, generating a modulated carrier signal with at least one pseudo random number (PRN) code and known as the spectrum spreading code. Some GNSS carrier signals 106 are further modulated with a navigation data message that provides the precise satellite orbital, clock, and other information. For example, spectrum-spreading codes can be unique for a satellite 105 and used as the identifier for that satellite. The navigation data included in a GNSS carrier signal 106 can convey one or more parameters necessary for determining the satellite position and the corrections required for increasing the pseudorange precision. As an example, the navigation message is obtained, or otherwise extracted, from the GNSS carrier signal 106 by recovering the bits through demodulating the signals transmitted by the satellites 105.

The control segment 102 includes a master control station 110a, data uploading station 110b, and monitor station 110c. The master control station 110a operates to adjust control parameters for the satellites 105, such as orbit parameters and onboard clocks. The monitor station 110c can monitor satellite signals and statuses, and relay them to the master control station 110a. The data uploading station 110b can receive correction information, such as time corrections and orbit corrections, from the master control station 110a. The user segment 103 includes devices that are configured to incorporate GNSS receivers, for example, in order to receive GNSS signals transmitted from satellites 105. Using GNSS receiver capabilities, a device of user segment 103 receives and processes the GNSS carrier signals 106 from the satellites 105 and uses these received signals to derive and apply location and time information, for instance. The devices employable in the user segment 103 range from mobile receivers, shown as cellular phone 120a, to specialized receivers used for complex navigation and mapping applications used by vehicle 120b, for example.

Figure 2:
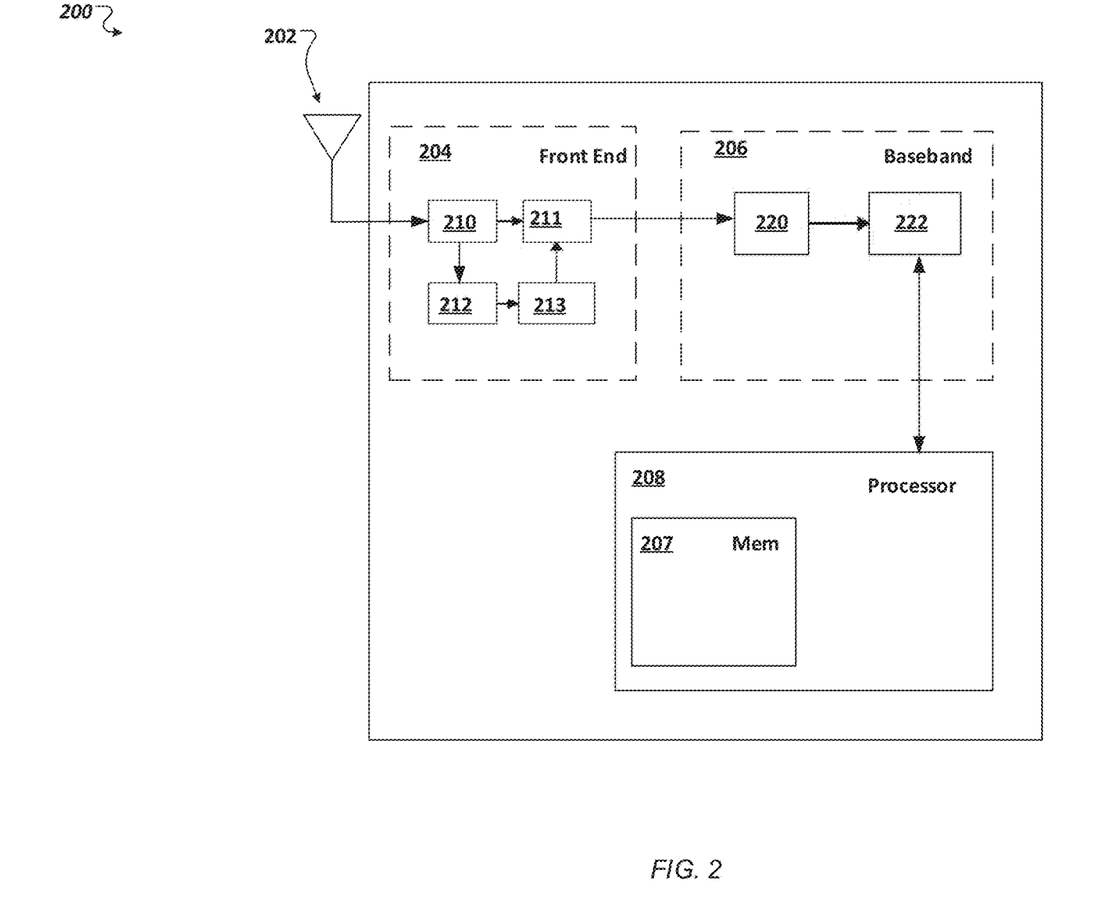
FIG. 2 shows an example of a GNSS receiver usable in the GNSS satellite system.

FIG. 2 shows an example of a GNSS receiver 200 used according to the Doppler error compensation and demodulation techniques. A GNSS receiver 200 is usable in the GNSS system (shown in FIG. 1) to receive and process a GNSS signal transmitted from a GNSS satellite. For example, the GNSS receiver 200 can receive a RF signal, and perform signal processing functions in order to measure a propagation delay (range) and Doppler frequency shift (range rate) of each received GNSS signal and to demodulate the navigation data. The GNSS receiver 200 includes circuitry that is generally grouped into three main parts that respectively serve generally different functions: front end circuitry 204 is configured to process GNSS signals received over one or more antennas 202 for signal processing operations; baseband circuitry 206 is configured to process the down-converted and digitized GNSS signals in order to provide observables, such as codes and carrier measurements; and processor circuitry 208 is configured to process GNSS based calculations, such as data demodulation, Doppler error compensation, and PVT.

The antenna 202 receives GNSS signals transmitted from a source, such as a satellite. For example, radio frequency (RF) signals of GPS satellites in view of the GNSS receiver 200 are received by antenna 202 with nearly hemispherical (i.e., above the local horizon) gain coverage. In some implementations, the antenna 202 is an L-band antenna, capturing GNSS carrier signals. For example, the GNSS carrier signals received by the antenna 202 carries information on its in-phase and quadrature components, including at least carrier Doppler. Additionally, an example of a GNSS carrier signal received by antenna 202 is modulated with navigation data bits that provide the precise satellite orbital and coefficients for error-correction.

The RF signals transmitted to the antenna 202 are propagated to the components of the front end circuitry 204 for RF processing. Upon reception, a GNSS signal tends to have low power, therefore the signal is initially input into a low-noise amplifier (LNA) 210. The signal is amplified by LNA 210 (e.g., preamp), which effectively sets a noise figure of the receiver. In some implementations, the front end can include a passive bandpass prefilter between the antenna 202 and the LNA 210 to minimize out-of-band RF interference. Although the implementation itself varies between architectures and hardware realizations in GNSS receivers, the principle is the same: the received signal is amplified, keeping the noise figure low and rejecting possible out-of-band interference.

Thereafter, the amplified and conditioned signals are then down-converted to intermediate frequencies (IF) using signal mixing frequencies from local oscillator (LO) 212. The LO 212 is derived from the reference oscillator by a frequency synthesizer 213, based on the frequency plan of the receiver design. The frequency synthesizer 213 provides the receiver with time and frequency reference for all the front end components. In some cases, one LO 212 per down-converter stage is used. In some implementations, a two-stage down-conversion to IF is used. The carrier Doppler and the PRN codes can be preserved after the mixing process during down-conversion. A carrier frequency can be lowered, but the Doppler remains referenced to the original L-band signal. In some implementations, automatic gain control (AGC) functions also take place at IF, and the AGC functions are responsible for adjusting the gain of the front end circuitry 204 in order to take benefit from the full dynamic range.

In some implementations, the front end circuitry 204 includes a clock for the GNSS receiver 200. For example, oscillators, such as the LO 212, is employable as the clock source for the GNSS receiver 200. In some implementations, LO 212, or the receiver clock, is implemented as a quartz crystal oscillators oven-controlled crystal oscillator (OCXO) or a temperature-compensated crystal oscillator (TCXO). For these types of receiver clocks, the frequency is generated by the piezoelectric effect in an oven-controlled quartz crystal disk. Existing quartz oscillators, for example LO 212, are not as stable as the atomic standards in the GPS satellites, and are more sensitive to temperature changes, shock, and vibration causing inaccuracies in the timing source at the receiver-end. In some cases, temperature-sensing oscillators are used to implement the receiver clock that are affected by environmental and configuration-related temperature changes experienced by the GNSS receiver 200. For modern consumer electronics, a GNSS receiver module is integrated with other modules in a manner that causes the temperature of the of the clock of the GNSS receiver to be affected by the heat from the other modules. Although the temperature can be reduced by disposing the clock of the GNSS receiver on a printer circuit board (PCB) in a particular manner, a configuration that achieves a temperature stability may not be feasible because the size of the PCB is limited. Therefore, the described techniques can improve the performance of signal demodulation, by implementing a GNSS receiver that is robust in tolerating, and compensating for, Doppler error in poor clock conditions.

Also, replacing a TCXO-based receiver clock, with other less temperature stable and cheaper crystal oscillators (XOs) can also contribute to poor clock conditions at the GNSS receiver 200. Thus, Doppler error compensation techniques described can be implemented by the processor circuitry 208 to mitigate the impact of poor clock conditions, such as temperature fluctuations, at the receiver clock. In some implementations, the GNSS receiver augments the timing of LO 212 by also having the capability to accept external timing from cesium or rubidium oscillators.

A successful correlation between the reference code and the incoming signal identifies which GNSS satellite signal is being received. Also, remaining navigation data bits can be demodulated. As an example, a clock of the GNSS receiver is potentially sensitive to temperature. For instance, if the temperature of the clock fluctuates, the frequency of the clock similarly experiences changes, and can further cause the carrier Doppler to change accordingly.

An analog-to-digital conversion process for signal quantization is performed by the front end circuitry 204 using an analog to digital convertor (ADC) 211. The incoming signals are digitized through the ADC 211 ensuring that quantization errors and dynamic ranges are appropriate to accommodate the signal's characteristics. As output from the ADC 211, the digitized IF signals are transmitted to the baseband circuitry 206 for further signal processing.

The baseband circuitry 206 receives the down-converted and digitized GNSS signal from the front end circuitry 204, and processes the signal to retrieve observables and employs several signal processing routines to acquire and track the carrier of GNSS signal. As an example, the baseband circuitry 206 uses several independent channels, where each channel individually tracks each respective satellite signal in order to provide GNSS observables and navigation data. Then, the data from each channel is integrated to derive a navigation solution.

The incoming signal to the baseband circuitry 206 is correlated using correlators 220. Correlation is usable to search for the satellites in view of the receiver 200. For instance, as the GNSS receiver 200 starts operating, and the GNSS receiver 200 determines which satellites are in view and can be tracked for extracting measurements, or acquisition. The GNSS signals are transmitted by moving satellites, thus there is a Doppler and code delay effect observed in the received signals at the GNSS receiver 200. Therefore, in detecting GNSS signals, the amount of delay and relative motion between the transmitted signal and the GNSS receiver 200 are unknown. In order to search for the GNSS signals, different local replicas, corresponding to different code delay/Doppler frequency pairs, are generated and correlated with the input signals. Correlators 220 accomplish correlation with one or more PRN code replicas that are generated in the GNSS receiver 200 taking into account the signal carrier frequency, code delay, Doppler frequency, and PRN code (which is unique to each satellite/signal). In some implementations, the signal is stripped of its Doppler frequency prior to correlation.

The incoming signal is repeatedly correlated using correlators 220 with the replica of the expected PRN code, which is known a priori. Then new estimations of the Doppler frequency and code delay are computed based on the assessment of the correlation outputs. As an example, a replica and the incoming signal are aligned, their correlation generates a peak and the code delay/Doppler frequency pair corresponding to the peak is used as a good estimate to initialize the tracking process. Correlations are also used by the correlators 220 to refine the local replica generation, so as to match as best as possible the incoming signal. The correlation results are then applied to support different tracking loops in providing a measurement of tracking quality.

Baseband circuitry 206 employs various tracking loop algorithms to find and follow a visible GNSS signal, by means of synchronization with the known PRN code. Tracking loops 222 implement GNSS tracking functions in an iterative way. For example, the tracking loops 222 are implemented as phase lock loops (PLL) or frequency lock loops (FLL) to track the incoming signal's phase and frequency, respectively. Thus, in some implementations the tracking loop 222 of the GNSS receiver 200 is one of either the PLL or the FLL. In some implementations, the tracking loops 222 include both PLL and FLL tracking algorithms. The PLL provides the carries phase and Doppler of GNSS signals, and the FLL provides the Doppler of GNSS signals. As an example, raw Doppler measurements are generated directly from the PLL or FLL. The GNSS receiver 200 tracks each signal using dedicated channels in parallel, where each channel tracks one signal (i.e., for single frequency users, each channel tracks one satellite), providing pseudorange and phase measurements, as well as navigation data and additional signal information, such as carrier-to-noise ratio.

The GNSS receiver 200 includes processor circuitry 208 that is configured to receive and process data extracted from a signal by the baseband circuitry 206, to perform navigation monitoring and control features, for example. The processor circuitry 208 processes the information from the tracking loops for different applications from computing position and velocity, performing time transfer, and collecting data to be post-processed by ground stations. Additionally, processor circuitry 208 implements numerous mathematical calculation and solving functions, such as calculations including but not limited to: navigation data decode; Doppler error compensation; and receiver's PVT calculation.

The processor circuitry 208 is configured to perform demodulation of the processed signal. Demodulation algorithms executed by the processor circuitry 208 extracts information coded onto the signal, in order to be used by GNSS based applications such as PVT computation. Demodulation is usable to extract navigation bits and the observables, namely pseudorange and Doppler frequency, from a signal. As an example, the demodulated navigation data bits provide the precise orbital location of the satellite and coefficients for error-correcting formulas used for increasing the pseudorange precision. Thereafter, navigation information (e.g., location and time of the user) can be calculated, using processor circuitry 208 to solve known equations that incorporate the measured range to the known locations of the GPS satellites. In some implementations, the processor circuitry 208 demodulates navigation data bits by extracting a binary stream including the bits that are modulo-2 added and modulated onto the RF carrier.

The processor circuitry 208 can also be configured to execute software for specific user applications, such as user interfaces and GPS navigation depending on the desired function of the receiver 200, for example a GNSS receiver implemented in a cellular phone. The GNSS receiver performs different tasks with the resulting GNSS information, and provides meaningful results to the user. In the example of a cellular phone, the application processor (AP) of the phone is usable as the processor circuitry 208 of the GNSS receiver 200. The processor circuitry 208 suitably is a System on Chip (SoC), which includes one or more integrated circuit (IC) devices. In an implementation of the GNSS receiver 200, the front end circuitry 204, baseband circuitry 206, and processor circuitry 208 can be integrated on a single IC device or multiple IC devices that are coupled with each other directly or that are disposed on a common circuit board. For example, the front end circuitry 204, baseband circuitry 206, and processor circuitry 208 are integrated in a single application specific integrated circuit (ASIC) chip. Alternatively, the front end circuitry 204 and baseband circuitry 206 are integrated in a single ASIC chip, and the processor circuitry 208 can be shared with other devices to reduce costs, for instance.

In addition, in accordance with various implementations, the processor circuitry 208 includes one or more processors, and can also include one or more additional dedicated processing units to perform signal processing capabilities, for example. In some implementations, the processor circuitry 208 includes circuitry for at least one Digital Signal Processor, at least one MicroController Unit (MCU), and at least one memory (Mem) device 207 to hold data and potentially instructions for the MCU. Many variations on the details of the architecture of the processor circuitry are possible. In some implementations, the processor 208 is used to implement the baseband processor 206. In this case, two distinct processors are not required to achieve the functionality of the processor circuitry 208 and the baseband circuitry 206.

Figure 3:
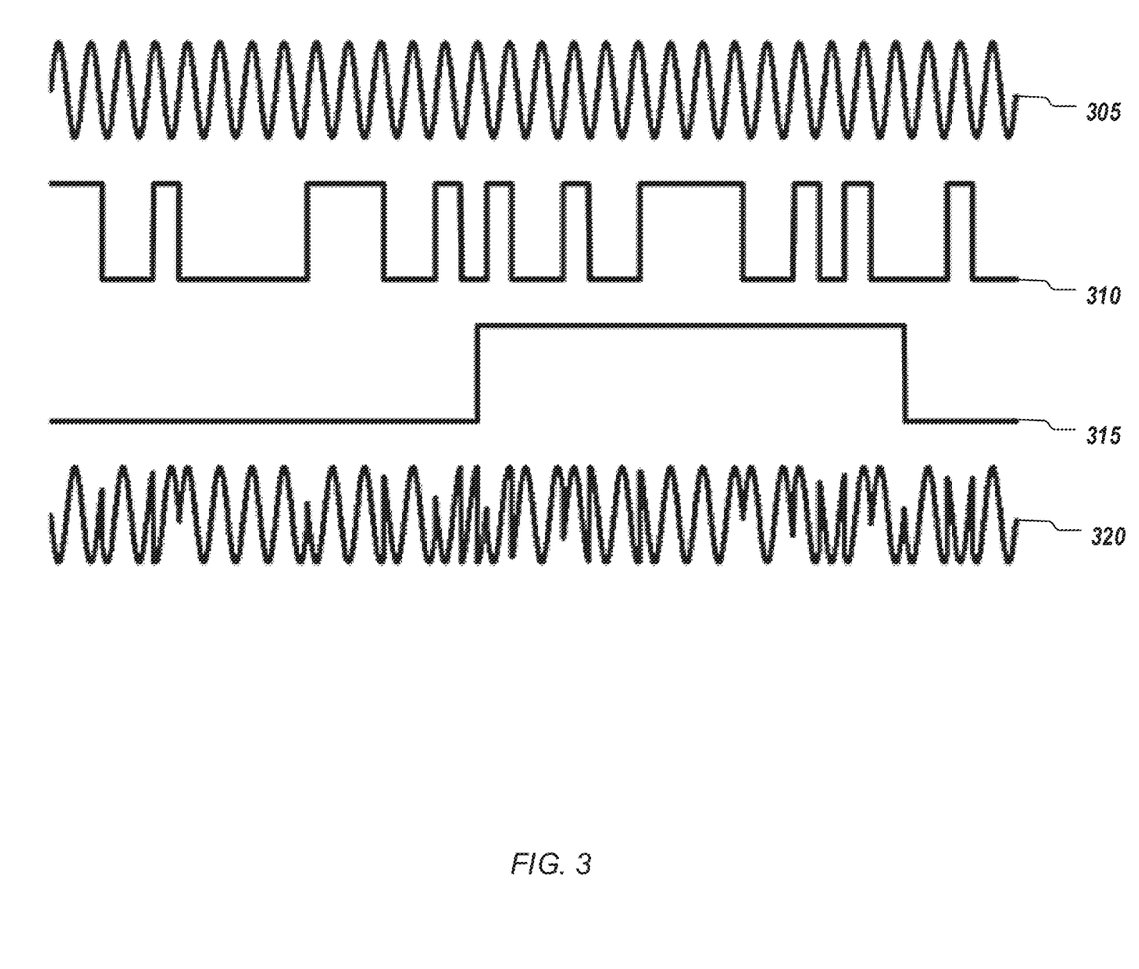
FIG. 3 shows an example of a GNSS carrier signal that is transmitted using the GNSS satellite system.

FIG. 3 shows an example of components of a GNSS carrier signal 320 that can be generated, transmitted, received, and processed using the GNSS system (shown in FIG. 1). As an example, the FIG. 3 illustrates a modulated GNSS carrier signal 320, such as a GPS L1 Coarse Acquisition (C/A) signal, that is received at a GPS receiver for signal processing, such as the Doppler error compensation and demodulation techniques described. In some cases, satellites in a GNSS system transmit navigation signals in two or more frequencies in the L band. The main signal in which the remaining components are modulated onto, as illustrated in FIG. 3, is an original carrier signal 305. The original carrier signal 305 is a Radio Frequency (RF) sinusoidal signal transmitted from the satellites at a given frequency.

The GNSS signal can also include a ranging code, such as Pseudo-Random Noise (PRN) sequences or PRN codes. A C/A PRN carrier 310 is shown as binary coded bits (i.e., zeros and ones) data representing the PRN code. At a GNSS receiver, the ranging code is employed to determine the travel time of a signal from satellite to receiver.

Also, the GNSS carrier signal 320 can include navigation data 315, which is also shown as a binary-coded message. In some cases, the navigation data 315 can be extracted, for example using demodulation of the GNSS carrier signal 320, to provide information on the satellite ephemeris (e.g., satellite position and velocity). The navigation data 315 can also include information including, but not limited to, clock bias parameters, almanac (with a reduced accuracy ephemeris data set), satellite health status, and other complementary information.

The illustrated signal components including the original carrier signal 305, the C/A PRN carrier 310, and the navigation data 315 can be modulated to resultantly generate the GNSS carrier signal 320 that is propagated to a GNSS receiver, for example. In some implementations, modulation of a L1 signal, is done using the quadrature phase shift keying (QPSK) scheme. The modulated GNSS carrier signal 320 can then be broadcasted by the satellite as spread spectrum signal to a GNSS receiver. The techniques described are discussed as relating to demodulation of navigation data bits as under poor clock conditions, but can be applied for demodulating other components of a GNSS carrier signal 320 at the GNSS receiver.

Figure 4A:
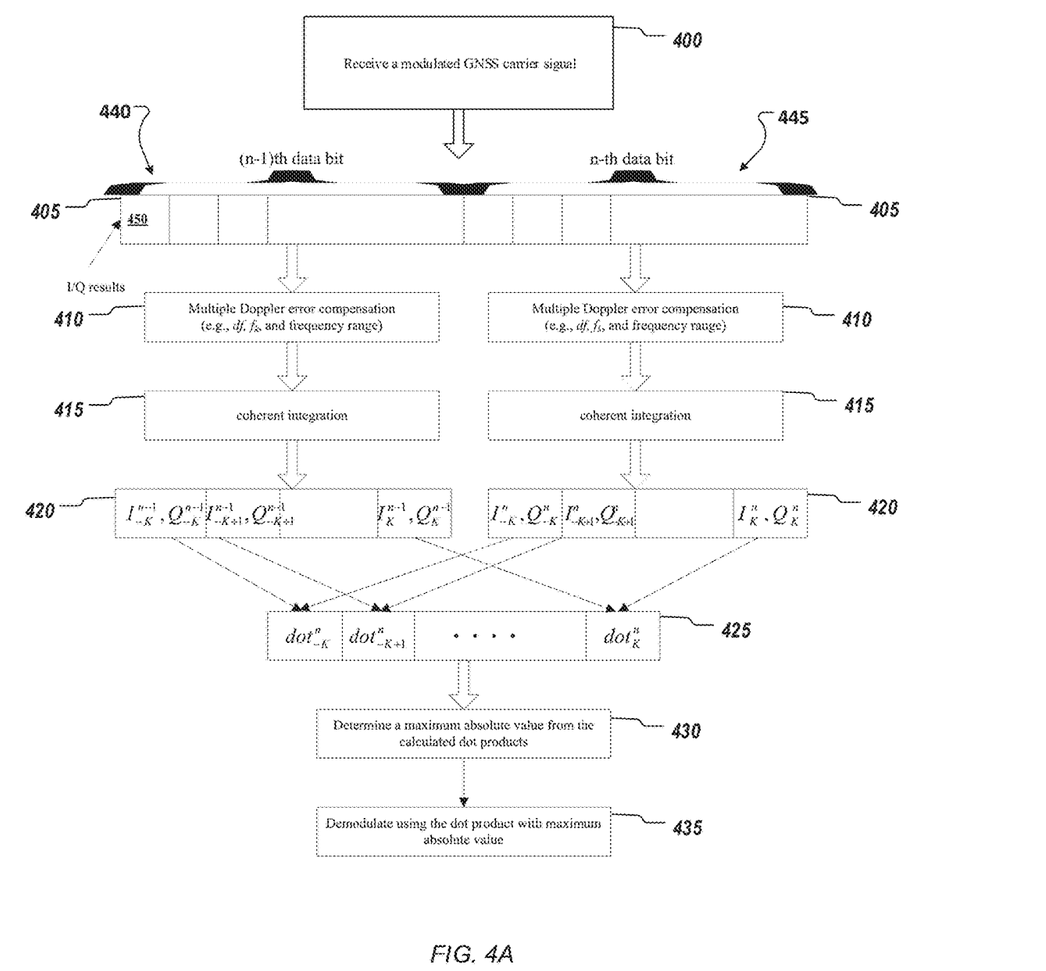
FIG. 4A shows an example process for demodulating GNSS navigation data bits.

FIG. 4A shows an example process for demodulating GNSS navigation data bits in conditions that can cause a Doppler error, such as a GNSS receiver operating under a poor clock condition. The process begins by receiving, at 400, a modulated GNSS carrier signal. For example, a satellite transmits the GNSS carrier signal to a GNSS receiver. For instance, the received GNSS carrier signal includes navigation data that has been coded to bits and modulated onto an RF carrier signal. Navigation data bits are received during a duration of the bit $T_{bit}$, that is related to the navigation data bit length. In the example illustrated in FIG. 4A, a navigation data bit received during a current bit duration $T_{bit}$ is the $n^{th}$ data bit 445, while the previous navigation data bit received during the previous duration is a $(n-1)^{th}$ data bit 440. As an example, a GPS signal has a $T_{bit}$ of 20 ms.

Thereafter, multiple in-phase (I) and quadrature (Q) integration results, shown as I/Q correlation results 450, are calculated at 405 for data bits of the received navigation data bits. As an example, multiple I/Q correlation results 450 are derived for both the $(n-1)^{th}$ data bit 440 and the $n^{th}$ data bit 445. Calculating the I/Q correlation results 450 can be implemented as a portion of detection signal processing, which is performed after the IF signal has been converted to baseband, for example. Correlators can be used to produce in-phase components, which are integrated and dumped to produce I correlation results; and quadrature components, that are integrated and dumped to produce Q correlation results. In some implementations, a GNSS receiver can implement integrate and dump processing used to calculate the I/Q correlation results 450 in the baseband circuitry (shown in FIG. 2). The I/Q correlation results 405 are generated using coherent integration of the correlation outputs over a coherent integration time T.

In some implementations, the techniques described use an integration time T that is an integer multiple of a period of the pseudorange code, before further processing the correlation output. In some cases, the coherent integration time T is a longer integration time as compared to existing GNSS signal demodulation techniques. In some implementations, the quantity of I/Q correlation results 450 in one data bit is an integer. For example, GPS C/A code has a period of 1 millisecond (ms), and the interval for one navigation data bit is 20 ms. Accordingly, the T used in coherent integration to calculate the I/Q correlation results 450 can be an integer multiple of the C/A code period, such as 1 ms, 2 ms, 4 ms, 5 ms, or 10 ms. In some cases, utilizing a larger value for T can reduce the number of I/Q correlation results 450 generated for data bits, and reduce the computation of Doppler error compensation. However, the larger T value can also reduce a maximum range of Doppler error for compensation, as discussed in detail below.

The described demodulation technique is in contrast to some existing GNSS demodulation methods (e.g., non-coherent integration) that derive I/Q results corresponding to the navigation data bit length, for example using a coherent integration period that is the same as a duration for a navigation data bit (i.e., $T_{bit}$). Then, a dot product using the I/Q results is calculated based on the navigation data bit length. In this case of existing demodulation techniques, the power loss and the Doppler error that can be tolerated during signal processing are directly affected by the Doppler error (i.e., $f_{err}$) and further limited by the bit boundaries associated with the navigation message, for example $T_{bit}$. The Doppler error that can be tolerated by some existing demodulation techniques is $1/(4\ T_{bit})$. For instance, non-coherent techniques can tolerate a maximum $f_{err}$ of 12.5 Hz. Moreover, the relationship between the power loss of dot production, $f_{err}$, and $T_{bit}$ experienced by some existing GNSS demodulation techniques can be represented mathematically as shown below:

$$\text{dot\_pow\_loss}=10\ \log\ 10(\sin\ c(\pi f_{err} T_{bit})\cos(2\pi f_{err} T_{bit})) \quad (1)$$

Although coherent integration, as implemented by the described techniques, provides advantages to GNSS signal processing (e.g., reducing noise) its performance can be degraded by large Doppler error, causing the correlation output to lose overall power. Thus, the current techniques also perform multiple Doppler compensation, at 410, to the calculated I/Q correlation results 450 based on correlation integration time T, thereby reducing the power loss and increasing the tolerable Doppler error. In some cases, the maximum Doppler error that can be tolerated by the described demodulation techniques is $1/(4\ T)$ Hz. Some traditional non-coherent demodulation techniques can tolerate some Doppler errors, such as a maximum Doppler error of 12.5 Hz, for example. In comparison, the techniques described can be implemented to support a tolerable maximum Doppler error of 500 Hz, for instance when a minimum T for a GPS carrier signal is 1 ms (i.e., one C/A code per period).

At 410, the Doppler error compensation techniques are performed including using multiple frequencies for compensation. For instance, a Doppler error compensation frequency $f_k$, which represents the $k^{th}$ frequency used from the multiple frequencies, can be applied during the compensation process. Some difficulties exist in obtaining an accurate and quantifiable Doppler error corresponding to a variance in the Doppler frequency received at the GNSS receiver and the Doppler frequency conveyed in a GNSS carrier signal. Therefore, the current techniques utilize compensation calculations for errors that can be experienced at multiple selected Doppler frequencies over a range, rather than applying a general formula to reduce the potential Doppler error to a single quantified value. As an example, after employing the described error compensation techniques, a Doppler error at a particular Doppler error compensation frequency can be represented mathematically as shown below:

$$\Delta f_k = \Delta f - f_k \quad (2)$$

The multiple Doppler error compensation frequencies are selected from within a maximum frequency range that limits the frequencies usable for compensation to be bound by max/min frequency thresholds. In some implementations, Doppler error compensation frequencies can be selected during design time of the GNSS receiver, and determined by the desirable maximum Doppler error to be tolerated by the navigation data bit demodulation techniques implemented. As an example, a maximum frequency range for Doppler error compensation frequencies can be set by the limit $-1/(2\ T)$ Hz to $1/(2\ T)$ Hz. The multiple frequencies used for Doppler error compensation frequency $f_k$ can be implemented as frequencies spanning the entirety of the range, including the max/min frequency limits of the maximum frequency range. Conversely, the Doppler error compensation frequencies can be implemented as any section, or portion, of frequencies within the range, and not including the max/min limits of the maximum frequency range. In addition to the Doppler error compensation frequency, $f_k$, being within the maximum frequency range, the frequencies can have a fixed frequency step value df.

Moreover, the compensation achieved, or the amount of Doppler error that can be removed, using Doppler error compensation, at 410, is determined by the implemented frequency step df. In instances where the frequency range for Doppler error compensation can cover the actual Doppler error (e.g., a Doppler error value that is close to the real Doppler error experienced by the GNSS system) then the Doppler error remaining after compensation will be no larger than 0.5 df. Thus, implementing Doppler error compensation using a smaller df results in a more robust and effective compensation technique, where significant amounts of Doppler error are removed from, or otherwise compensated for, before further demodulation processing. In contrast, using a larger df which becomes a larger step between Doppler error compensation frequencies, reduces the number of Doppler error frequencies used during compensation, which also provides advantages associated with reducing the computational load of the technique (e.g., faster processing time).

However, increasing the frequency step value too significantly can reduce the power loss and decrease the amount of compensation achieved by the described techniques. Accordingly, the realized power loss of dot production of the described techniques is also determined by the df value employed in Doppler error compensation. Thus, in some implementations, a desired power loss of dot production can be used to determine an appropriate value for df that is used to implement Doppler error compensation techniques described. In some cases, a desired power loss of dot production is a maximum power loss that is predetermined as a design consideration for a GNSS receiver. As an example, compensation techniques can be implemented where T is 1 ms, the maximum frequency range is from −500 Hz to 500 Hz, and the Doppler error compensation frequency $f_k$ can be from −50 Hz to +50 Hz with a frequency step df of 10 Hz.

Thus, Doppler error compensation, performed at 410, also includes using a certain number of Doppler error compensation frequencies. The number of Doppler error compensation frequencies used during compensation can be determined based on the frequency step df and the maximum threshold frequency. In this case, a frequency range of $-f_{max}$ to $f_{max}$, a number of Doppler error frequencies applied to compensation can be calculated as $(2f_{max})/df$.

At 415, coherent integration is performed in order to calculate the correlation results, I/Q results, after Doppler error compensation. Determining I/Q results after the Doppler error compensation can be implemented mathematically as shown below:

$$I_k(i) = I(i)\cos(\theta_k(i)) + Q(i)\sin(\theta_k(i)) \quad (3)$$

$$Q_k(i) = Q(i)\cos(\theta_k(i)) - I(i)\sin(\theta_k(i)) \quad (4)$$

$$\theta_k(i) = 2\pi f_k T + \theta_k(i-1) \quad (5)$$

where, the $I_k$ and $Q_k$ are the correlation results after Doppler error compensation;
k stands for the $k^{th}$ frequency for Doppler error compensation;
i stands for the $i^{th}$ correlation results;
$\theta_k$ is the phase, and the $\theta_k(0)$ is 0;
$f_k$ is the frequency for Doppler error compensation, and T is the coherent integration time of I/Q results.

The I/Q results calculated based on Doppler error compensation, which are based on T, are then integrated at 420. The coherent integration of $I_k$ and $Q_k$ are performed for one data bit, or integrating using the period $T_{bit}$. As a result, $I_k^n$ and $Q_k^n$ are derived as the coherent integration results of $I_k$ and $Q_k$ at a $n^{th}$ data bit for the navigation data bits in a GNSS carrier signal, for example. The coherent integration of I/Q results based on Doppler compensation can be represented mathematically as:

$$I_k^n = \sum_i I_k(i) \quad Q_k^n = \sum_i Q_k(i) \quad (6)$$

where $I_k^n$ and $Q_k^n$ are the coherent integration results of $I_k$ and $Q_k$ at the $n^{th}$ data bit.

In some implementations, coherent integration at 420 includes simplifying the Doppler error compensation and coherent integration by using an N-point Fast Fourier Transform (FFT). In this case, a corresponding frequency step df can be 1/(NT). The FFT application can be represented mathematically as:

$$I_k^n + jQ_k^n = \text{FFT}(I+jQ) \quad (7)$$

Thereafter, dot products of the I/Q results for one bit are calculated at 425. In some existing GNSS non-coherent integration schemes, the dot product of the signal can represent a filtering operation, that is used to detect and process data within the signal. For example, detection performed in a GNSS receiver, for example, of a processed signal with multiple measurements can use coherent integration (e.g., a dot product, a matched filter, a correlator, a finite impulse response (FIR) filter) followed by detection. Calculating the dot product is related to signal modulation, and can be used for extracting differential data, where information about the bit stream is contained in the changes of phase of the transmitted signal, such as in binary phase-shift keying (BPSK) demodulation. Subsequently, the output demodulated bit sequence is generated by taking the dot product of an output of a correlator, such as the I/Q results. Thus, the dot products used in the demodulation technique described, are based on correlation results in which the Doppler error has been compensated for, or otherwise reduced. The dot product is calculated using:

$$\text{dot}_k^n = I_k^n I_k^{n-1} + Q_k^n Q_k^{n-1} \quad (8)$$

In some cases, there is a power loss that can be associated with calculating a dot product (e.g., a signal power that is shared in both the I and Q components). According to the techniques described, a power loss for the dot production calculation is determined by df employed during Doppler error compensation. As an example, a large frequency step df potentially increases the power lost in dot production. A maximum power loss of dot production of the techniques described is calculated by:

$$\text{dot\_pow\_loss} = 10 \log 10(\sin c(0.5\pi df T_{bit})\cos(\pi df T_{bit})) \quad (9)$$

where $T_{bit}$ is the duration of one data bit.

Thus, an appropriate df usable to implement Doppler error compensation as described, can be calculated when a corresponding desirable maximum power loss is given, or otherwise known, at design time. As an example, a GPS signal has a $T_{bit}$ of 20 ms. In the case where a Doppler error $f_{err}$ is 10 Hz, the power of dot production for traditional non-coherent modulation for example is represented mathematically as:

$$10 \log 10(\sin c(\pi \times 10 \times 0.02)\cos(2\pi \times 10 \times 0.02)) = -5.4 \text{ dB} \quad (10)$$

In continuing with the example, but implementing the techniques described and using a df of 10 Hz for Doppler error compensation, a power loss is represented mathematically as:

$$10 \log 10(\text{sin } c(\pi \times 5 \times 0.02)\cos(2\pi \times 5 \times 0.02)) = -1 \text{ dB} \quad (11)$$

Moreover, in the case where the df selected is 5 Hz, the power of dot production for the techniques described is represented mathematically as:

$$10 \log 10(\text{sin } c(\pi \times 2.5 \times 0.02)\cos(2\pi \times 2.5 \times 0.02)) = -0.24 \text{ dB} \quad (12)$$

Thus, the described Doppler error compensation realizes a solution that significantly reduces the power loss of dot production used in demodulation of navigation data bits, for example, as compared to some existing demodulation techniques.

As illustrated in FIG. 4A, multiple dot products are calculated based on the multiple correlation outputs, or I/Q results, for one bit. The process includes determining, at 430, a maximum value from the calculated dot products. An absolute value algorithm can be used to find the maximum absolute value resulting from dot production. In some cases, a maximum dot product value is considered to correspond to the smallest Doppler error achieved by applying the Doppler error compensation techniques. Accordingly, based on the significantly reduced Doppler error, the maximum dot product is further selected to be used for further processing in demodulation. Determining a maximum dot product can be performed by processor circuitry of the GNSS receiver sequentially, for example, an absolute value for the each calculated dot products is compared to the absolute value of the next calculated dot product. In some implementations, a parallel processing approach can be used to determine the maximum dot product. An equation usable to determine a maximum dot product is shown below:

$$\text{abs}(dot_M^n) = \max(\text{abs}(dot_k^n)) \quad (13)$$

where $dot_M^n$ is the dot production with maximum absolute value.

Thereafter, the process performs demodulation of the GNSS carrier signal, at 435, using the maximum dot product to extracted navigation bits from the received signal. As an example, demodulating can include using non-coherent demodulation. Other techniques employable for demodulating navigation data bits can be used as deemed appropriate. The signal demodulation techniques described can be represented mathematically as:

$$D(n) = \begin{cases} D(n-1), & dot_M^n \geq 0 \\ -D(n-1), & dot_M^n < 0 \end{cases} \quad (14)$$

Figure 4B:
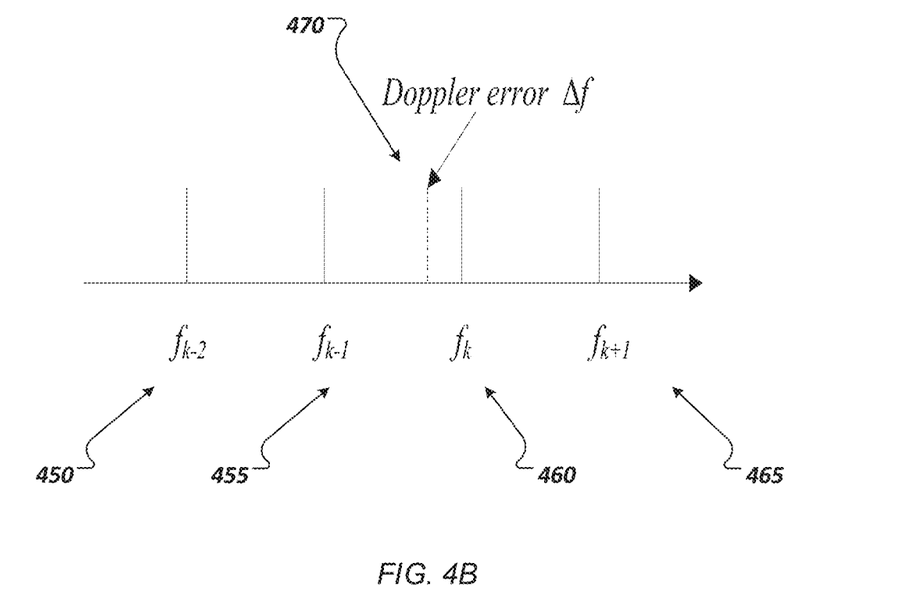
FIG. 4B is a graphical representation of an example of a Doppler error at a particular Doppler error compensation frequency.

Moreover, the techniques described can provide an improve accuracy in comparison to existing techniques utilized for obtaining Doppler error. Some existing techniques employ traditional frequency discriminators, such as arctan(Dot, Cross), to calculate Doppler error. However, the dot product and cross product can be sensitive to frequency error. For instance, frequency error potentially reduces the power of dot product and cross product. Additionally, large frequency error can cause a frequency discriminator to output inaccurate results. Therefore, using multiple frequencies, as in the techniques described, can improve the accuracy in compensating for the Doppler error. As an example in the graph shown in FIG. 4B, multiple frequencies $f_{k-2}$ 450, $f_{k-1}$ 455, $f_k$ 460, and $f_{k+1}$ 465 are illustrated. In the example, $f_k$ 460 is the closest frequency to the Doppler error $\Delta f$ 470. Thus, according to disclosed error compensation techniques, the I/Q results compensated by employing compensation frequency $f_k$ 460 can have a substantially small Doppler error and produce the maximum absolute dot product value, which is then used to extract navigation bits from the received signal, as discussed in detail in reference to FIG. 4A. In some cases, the extracted navigation data bit can be further employed by GNSS user segment device (shown in FIG. 1), for example, to support various navigation capabilities, such as positioning service applications. Thus, the techniques described realize a solution that not only compensates for Doppler error that can affect a Doppler frequency at the GNSS receiver (e.g., poor clock conditions), but also prevents the inaccuracies related to Doppler error from propagating into demodulation processing and potentially causing additional errors in the extracted navigation data bits.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more processors to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method of operating a global navigation satellite system (GNSS) receiver of a mobile network device, the method comprising:

receiving a modulated GNSS carrier signal at the GNSS receiver, wherein the GNSS carrier signal includes navigation bits;

compensating for a Doppler error of the GNSS carrier signal using Doppler error compensation frequencies, wherein the compensating comprises determining in-phase (I) correlation results and quadrature (Q) correlation results at the Doppler error compensation frequencies;

calculating dot products using the I correlation results and the Q correlation results from the compensating;

determining a dot product from the calculated dot products having a maximum absolute value;

demodulating the GNSS carrier signal using the determined dot product having the maximum absolute value to extract the navigation bits from the GNSS carrier signal;

based on the navigation bits, calculating at least one of a position of a satellite, a position of the GNSS receiver, a velocity of the GNSS receiver, or a time of the GNSS receiver; and performing a GNSS navigation and mapping operation at the mobile network device based on the at least one of the position of the satellite, the position of the GNSS receiver, the velocity of the GNSS receiver, or the time of the GNSS receiver.

2. The method of claim 1, wherein:

the Doppler error compensation frequencies are selected from frequencies within a frequency range;

the frequency range is based on a period of pseudorange code associated with the modulated GNSS carrier signal; and the Doppler error compensation frequencies comprise a frequency provided by a clock of a GNSS receiver performing the method.

3. The method of claim 2, wherein the frequency range is calculated based on a coherent integration time (T) used in the compensating.

4. The method of claim 3, wherein the frequency range is calculated using $-1/(2T)$ Hz to $1/(2T)$ Hz.

5. The method of claim 3, wherein the compensating is usable to compensate for a maximum Doppler error of $1/(4T)$ Hz.

6. The method of claim 1, wherein:

the I correlation results and the Q correlation results from the compensating are determined using a coherent integration time (T); and the coherent integration time (T) is an integer multiple of a period of a pseudorange.

7. The method of claim 6, wherein a quantity of the I correlation results and the Q correlation results from the compensating for one bit is an integer.

8. The method of claim 1, wherein:

calculating the dot products using the I correlation results and the Q correlation results from the compensating comprises applying a coherent integration to the I correlation results and the Q correlation results from the compensating to produce coherent integrals $I''_k$ and $Q''_k$ for one bit (n) using a coherent integration time for one bit ($T_{bit}$); and the coherent integration time for one bit ($T_{bit}$) is a duration for one bit of the navigation bits.

9. The method of claim 1, further comprising downconverting the GNSS carrier signal to a baseband signal,
wherein the compensating for the Doppler error of the GNSS carrier signal using the Doppler error compensation frequencies is performed subsequent to the downconverting of the GNSS carrier signal.

10. A method of operating a global navigation satellite system (GNSS) receiver of a mobile network device, the method comprising:
receiving a modulated GNSS carrier signal at the GNSS receiver, wherein the GNSS carrier signal includes navigation bits;
compensating for a Doppler error of the GNSS carrier signal using Doppler error compensation frequencies, wherein the compensating comprises determining in-phase (I) correlation results and quadrature (Q) correlation results at the Doppler error compensation frequencies, wherein the Doppler error compensation frequencies are incrementally separated by a fixed frequency step value;
calculating dot products using the I correlation results and the Q correlation results from the compensating;
determining a dot product from the calculated dot products having a maximum absolute value;
demodulating the GNSS carrier signal using the determined dot product having the maximum absolute value to extract the navigation bits from the GNSS carrier signal;
based on the navigation bits, calculating at least one of a position of a satellite, a position of the GNSS receiver, a velocity of the GNSS receiver, or a time of the GNSS receiver; and
performing a GNSS navigation and mapping operation at the mobile network device based on the at least one of the position of the satellite, the position of the GNSS receiver, the velocity of the GNSS receiver, or the time of the GNSS receiver.

11. The method of claim 10, wherein the fixed frequency step value is calculated based on a predetermined maximum power loss of the GNSS carrier signal associated with calculating the dot products.

* * * * *